W. A. BUCHANAN.
THILL COUPLING.
APPLICATION FILED APR. 30, 1909.
972,096.
Patented Oct. 4, 1910.
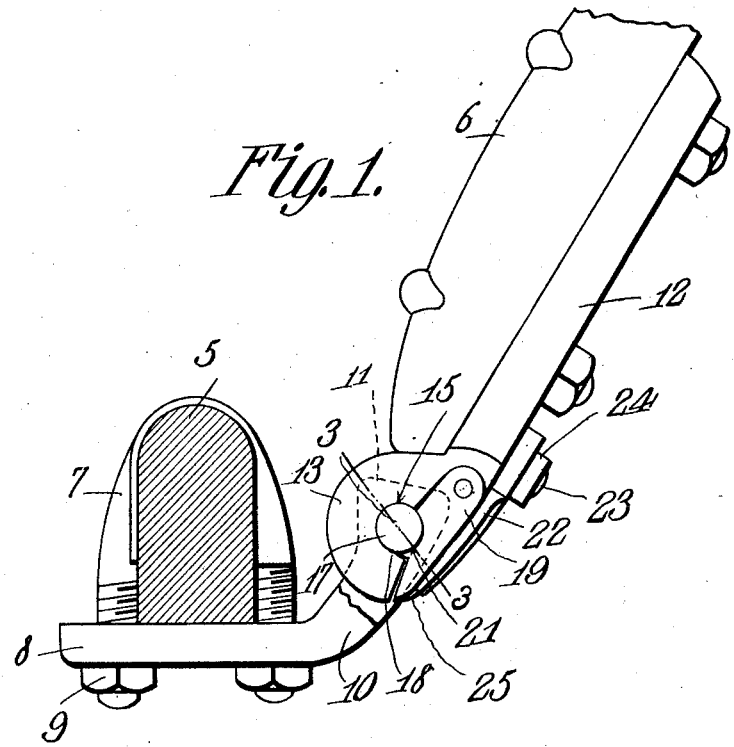
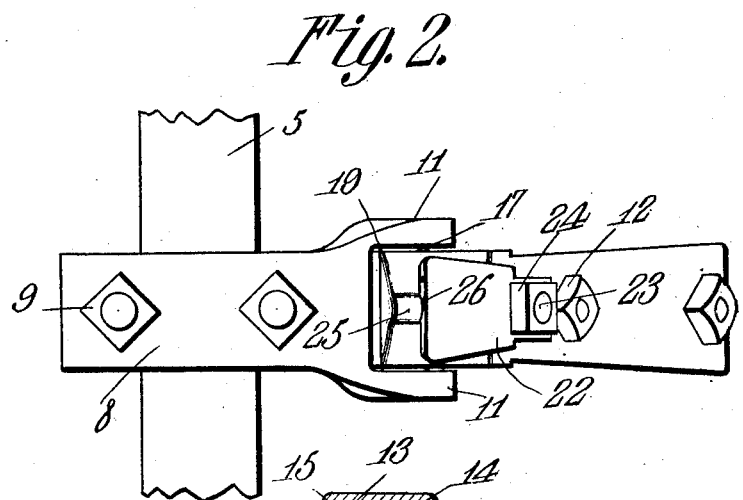
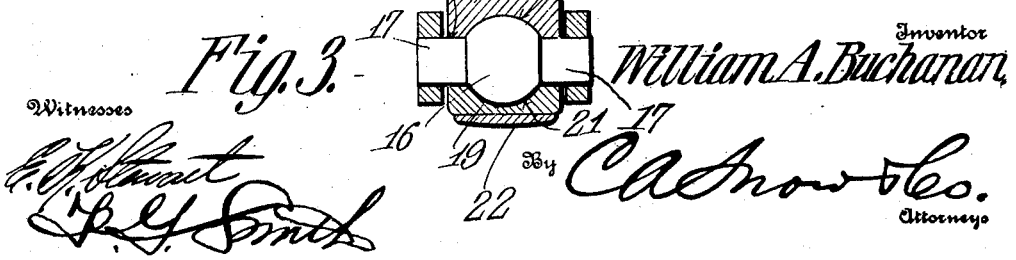
Witnesses
Inventor
William A. Buchanan,
By C. A. Snow & Co.
Attorneys

UNITED STATES PATENT OFFICE.

WILLIAM A. BUCHANAN, OF ASHEVILLE, NORTH CAROLINA, ASSIGNOR TO BALL BEARING COUPLER COMPANY.

THILL-COUPLING.

972,096.  Specification of Letters Patent.  Patented Oct. 4, 1910.

Application filed April 30, 1909. Serial No. 493,166.

*To all whom it may concern:*

Be it known that I, WILLIAM A. BUCHANAN, a citizen of the United States, residing at Asheville, in the county of Buncombe and State of North Carolina, have invented a new and useful Thill-Coupling, of which the following is a specification.

It is the object of the present invention to provide an improved construction of thill coupling, and the invention relates more specifically to that class of thill couplings in which the bearing for the coupling pin embodies coöperating members, between which the pin is journaled, and, whereas in the present constructions of such couplings, the strain upon the sections thereof tends to separate the sections, it is the object of the present invention to provide a construction of bearing in which the strain will be borne by one of the sections solely, the other section performing merely the function of a retaining member.

Incidentally, the invention aims to provide a construction of thill coupling of the class above described, in which the retaining section will be securely locked in position to retain the coupling pin in the other section of the coupling, which latter section, as above stated, sustains the strain imposed upon the coupling.

In the accompanying drawings, Figure 1 is a view in side elevation of a thill coupling constructed in accordance with the present invention. Fig. 2 is a bottom plan view of the coupling. Fig. 3 is a transverse sectional view on the line 3—3 of Fig. 1.

In the drawings, there is shown in section, a vehicle axle (5), to which a thill, indicated by the numeral 6 is to be coupled through the instrumentality of the coupling, embodying the present invention, and upon the axle (5) there is disposed the usual clip (7) and against the under side of the axle the usual clip plate (8) through which the arms of the clip (7) engage, there being nuts (9) threaded upon the said arms and holding the said clip plate firmly in position against the under side of the axle. The clip plate (8) is formed with a forward extension (10) which is bifurcated and formed with spaced ears (11) which are apertured and receive between them, as will be presently explained, that portion of the coupling which is carried by the thill.

Secured upon the thill (6) in the usual manner, is a thill iron (12) which at its inner end is formed with a head (13) embodying one member of the coupling. This head (13) is formed in its under-face with a concavity (14) and to each side of the concavity with bearing recesses (15). The concavity (14) is substantially semispherical and the recesses (15) are substantially semicylindrical, and disposed within the bearing formed by the said concavity and the recesses, is the coupling pin embodied in the device, the said pin comprising a substantially spherical portion (16), and trunnions (17), projecting diametrically oppositely from the said spherical portion (16) of the pin, the said portion (16) of the pin seating in the concavity (14) and the trunnions (17) seating in the recesses (15), and at their extremities having bearing in the apertures in the ears (11) of the clip plate. As has heretofore been stated, it is desirable to have all of the strain to which the coupling is subjected, borne by one of the coupling members solely, and in attaining this end, the walls of the recesses (15) are extended at the rear sides of the recesses, substantially radial with respect to the trunnions (17) of the coupling pin or member, seated in the bearing, as indicated by the numeral (18) in Fig. 1 of the drawings. In other words, there is provided, for the reception of the coupling pin, a substantially hook-shaped bearing, embodied in the coupling member or head (13), this member being the one upon which all of the strain is imposed.

As a means for retaining the coupling pin in the bearing in the head (13), or in other words for holding this head or member against accidental disengagement from the coupling pin, there is provided a non-resilient cap plate which is indicated by the numeral (19) and which is pivoted to the head (13) and is adapted to be swung to a position substantially against the under-face of the said head as is clearly shown in Fig. 1 of the drawings, this cap plate (19) is formed in its upper face with a shallow bearing recess (21) which embraces a portion of the coupling pin and affords an additional bearing therefor.

In order to hold the cap plate firmly in position to close the bearing in the head (13) in which the coupling pin is seated, there is provided a locking plate which is nonresilient and is indicated by the numeral

(22) and is formed with an opening (not shown) through which projects a threaded stud (23) formed upon the thill iron (12), there being a nut (24) threaded upon this stud whereby to hold the locking plate (22) firmly in position to engage with the cap plate and hold the same against the head (13). As will be observed from an inspection of Figs. 1 and 2 of the drawings, the locking plate (22) extends beneath the cap plate (19) or in other words, overlaps the same and it will be understood that when the nut (24) is tightened, the said locking plate will bear firmly against the cap plate for the purposes above stated. The stud (23) projects through the locking plate (22) at a point near the threaded end thereof, and the body portion of this plate extends rearwardly of the stud beneath the cap plate. In order to securely hold the locking plate against lateral displacement with respect to the cap plate, a lug (25) is formed upon the under side of the said cap plate, and seats in a shallow recess (26) formed in that face of the locking plate (22) which bears against the said cap plate.

From the foregoing description of the invention, it will be understood that by loosening the nut (24) to a slight degree, the locking plate (22) may be swung to either side and from engagement beneath the cap plate, whereupon the said cap plate will drop from engagement with the head (13), and thereby permit disengagement of the head from the coupling pin. It will be further understood that when the device is manufactured, the parts or elements thereof may be so proportioned that when the cap plate is in engagement with the coupling pin, it will not engage or bear flat against the under-face of the head (13) so that should the coupling pin become worn, the wear may be taken up by merely tightening the nut (24).

What is claimed is:—

In a device of the class described, a thill iron having a head formed with a bearing, a rigid non-resilient cap plate carried by the head to close the bearing, a coupling pin seated in the bearing, the cap plate having a portion engaging with the coupling pin whereby to afford an additional bearing therefor, a stud upon the thill iron, a rigid non-resilient plate formed with an opening receiving said stud, the said plate overlapping the cap plate, and a nut threaded upon the stud whereby to hold the last mentioned plate in position against the cap plate, the cap plate being formed with a rib and the last mentioned plate being formed with a seat for receiving said rib whereby to hold the last mentioned plate against turning upon the stud as a pivot except subsequent to turning the nut to position spaced from the said plate.

In testimony that I claim the foregoing as my own, I have hereto affixed my signature in the presence of two witnesses.

WILLIAM A. BUCHANAN.

Witnesses:
 EDW. B. ATKINSON,
 W. E. JOHNSON.